March 22, 1960 E. TÖPFER 2,929,340
APPARATUS FOR THE AUTOMATIC INSERTION OF
STICKS INTO ICE CREAM BODIES
Filed Aug. 13, 1956 2 Sheets-Sheet 1

March 22, 1960  E. TÖPFER  2,929,340
APPARATUS FOR THE AUTOMATIC INSERTION OF
STICKS INTO ICE CREAM BODIES
Filed Aug. 13, 1956  2 Sheets-Sheet 2

United States Patent Office 2,929,340
Patented Mar. 22, 1960

2,929,340

APPARATUS FOR THE AUTOMATIC INSERTION OF STICKS INTO ICE CREAM BODIES

Ernst Töpfer, Dusseldorf, Germany, assignor to Benz & Hilgers Maschinenfabrik, Dusseldorf, Germany, a corporation of Germany Application August 13, 1956, Serial No. 603,523

Claims priority, application Germany August 27, 1955

9 Claims. (Cl. 107—8)

The present invention relates to an apparatus for the automatic insertion of sticks into ice cream bodies.

It is one object of the present invention to provide an apparatus for the automatic insertion of sticks into ice cream bodies in which the ice cream is filled into a mold of predetermined shape, which mold is equipped with a wrapper for completely wrapping the ice cream body, whereupon the wrapper while the ice cream body is in its soft state receives a slot-like opening, and finally the stick is inserted through said opening in the wrapper into the ice cream body.

Other devices are known for inserting sticks into ice cream bodies according to which the ice cream body is formed by casting or by cutting off a portion of a larger body and the stick is inserted, prior to the wrapping of the ice cream body in its already hardened state, mechanically or manually. The foil serving as a wrapper is folded around the ice cream body in such manner that the end face of the body opposite the stick is covered up by means of folding over the end portions, while the wrapper end projecting over the stick is turned around the stick.

Besides requiring two completely separate folding steps by means of complicated and expensive folding devices, the organs performing the turning of the wrapper end is not capable of effecting a satisfactory sealing of the wrapper on the flat faces of the stick and, thereby, on the end face of the ice cream body. Consequently, air access causes melting of the ice cream body in the vicinity of the stick and permits running of the ice cream along the stick and bringing about the known and troublesome soiling of the hands.

Another drawback is also readily apparent, since the stick inserted into the ice cream body in accordance with known insertion methods results in a loose connection. This is caused by the fact that the stick, which is warm relative to the hard frozen ice cream body, upon insertion into the ice cream body, brings about melting of the latter for a short period within the range of the stick, whereby, however, the melting process is terminated in view of the surrounding ice cream mass, which is frozen well below the freezing point, prior to a proper connection of the molten ice cream mass with the stick or prior to a penetration of the ice cream mass into the fibers of the wooden stick. The loosely inserted stick has the disadvantage that the ice cream body may easily be separated therefrom if improperly held and may fall off, but also the additional disadvantage that the ice cream body may slide along the stick towards the hand and soil the hand, if the ice cream body is consumed up to the stick.

It is, therefore, another object of the present invention to provide an apparatus for automatic insertion of sticks into ice cream bodies which avoids the aforementioned drawbacks and disadvantages.

It is also another object of the present invention to provide an apparatus for automatic insertion of sticks into ice cream bodies which lends itself particularly to a combination with lately developed processes for manufacturing wrapped ice cream bodies.

It is still another object of the present invention to provide an apparatus for the automatic insertion of sticks into ice cream bodies in which the ice cream is filled into a mold of predetermined shape which mold is equipped with a wrapper for completely wrapping the ice cream body, whereupon the wrapper while the ice cream body is in its soft state receives a slot-like opening which extends through the wrapper, and finally the stick is inserted through said opening into the ice cream body, whereby the slot-like opening is of a width slightly less than the width of the stick received in said opening, in order to achieve a complete sealing relative to the wrapper.

It is yet a further object of the present invention to provide an apparatus for the automatic insertion of sticks into ice cream bodies according to which means are provided to enclose the ice cream body on all sides temporarily and in particular for the duration of the formation of the slot-like opening in the wrapper and for the duration of the following insertion of the stick into said opening in order to maintain the predetermined shape of the soft and wrapped up ice cream body.

It is another object of the present invention to provide an apparatus for the automatic insertion of sticks into ice cream bodies according to which the wrapping foil, which engages closely the soft ice cream mass, maintains the shape of the later hardened ice cream body, whereby the tips of the folds of the wrapper on both end faces of the ice cream body prevent an undesired opening of the wrapper.

It is also a still further object of the present invention to provide an apparatus for the automatic insertion of sticks into ice cream bodies in which the ice cream body is brought at first to the melting point within the range of the stick during the insertion of the latter into the soft ice cream body. The melted portion of the ice cream body can form, however, an intimate connection with the stick and can also penetrate into the fibers of the latter in view of the temperature of the surrounding ice cream mass, which temperature is only slightly below the freezing point, in order to freeze solidly again slowly by assuming a temperature below the freezing point. It has been found that a stick inserted in accordance with this method shows, after consuming the ice cream body, a visible ice incrustment which intimately adheres to the stick. This appearance is clear proof, that the stick freeezs into the ice cream body, thereby eliminating completely the known drawbacks inherent in loose sticks.

With these and other objects in view, which will become apparent in the following detailed description, the present invention will be clearly understood in connection with the accompanying drawings, in which.

Figure 1:
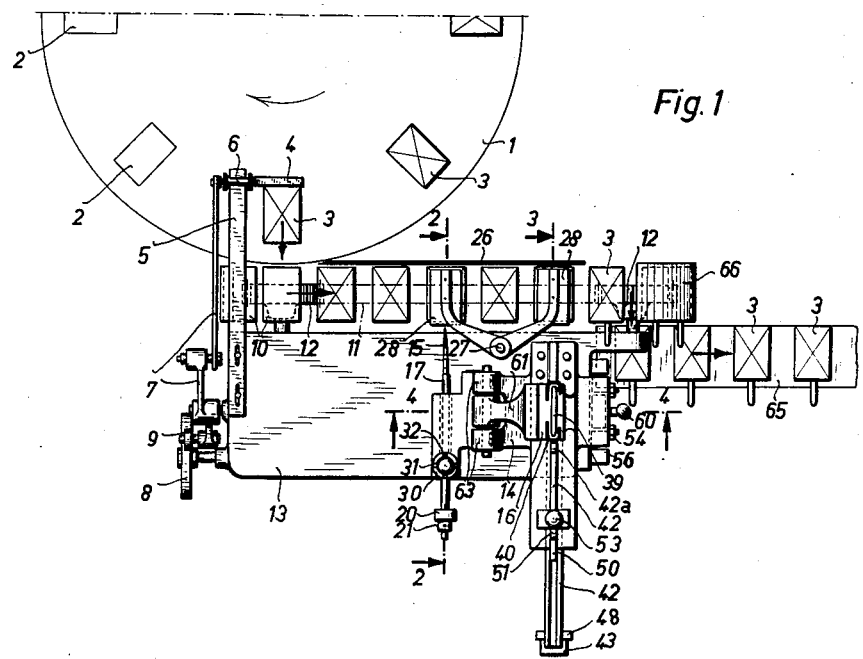
Figure 1 is a diagrammatic top plan view of the present apparatus.
Figure 2:
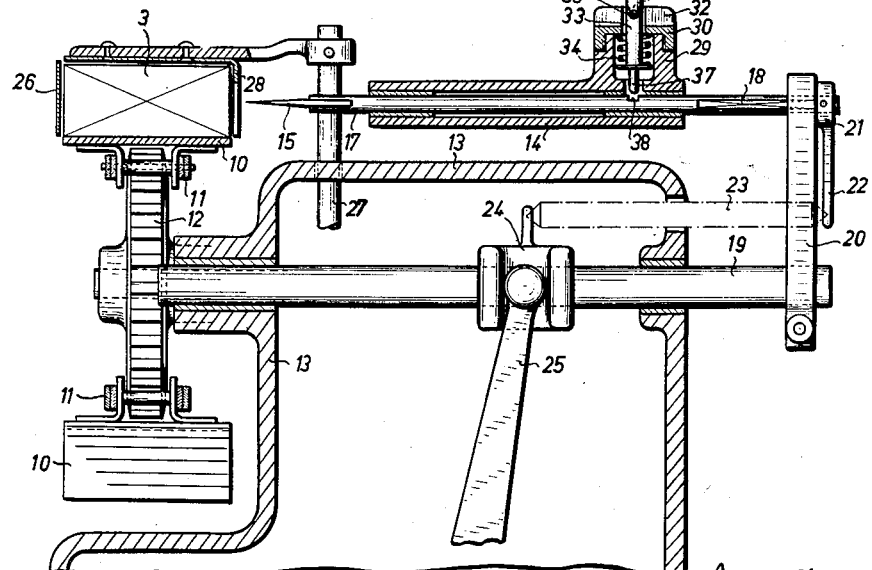
Fig. 2 is a section along the lines 2—2 of Fig. 1.
Figure 3:
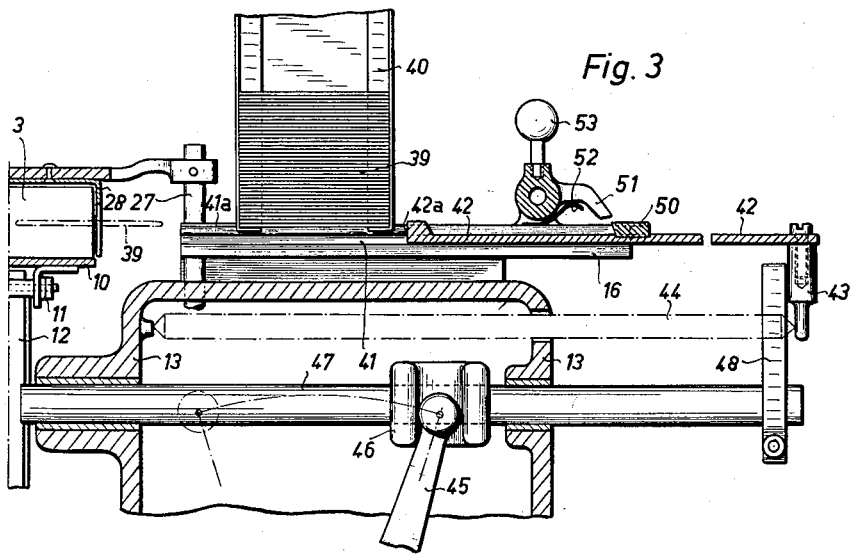
Fig. 3 is a section along the lines 3—3 of Fig. 1.
Figure 4:
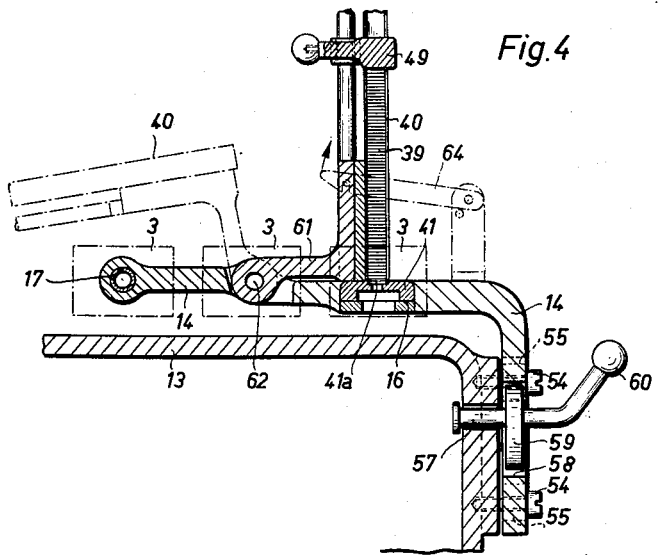
Fig. 4 is a section along the lines 4—4 of Fig. 1.

Referring now to the drawings and in particular to Figs. 1 to 4, the present apparatus comprises a turntable 1 on which a plurality of rectangular molds 2 are disposed in known manner. Each of the molds 2 is at first provided with a prefolded wrapper sheet which is open at its top, in which wrapper sheet an exact amount of ice cream mass is filled at a following station, whereupon during the continued turning of the turnable 1 the upwardly projecting ends of the wrapper sheet are folded over. The completely packed ice cream body 3 is then ejected from the mold 2 by lifting its bottom plate.

The ice cream body 3 is then transferred to a holder 10 of an intermittently moving, endless chain 11, which is disposed tangentially to the periphery of the turntable 1, by means of a slide 4 which is connected with a roller 6 running on a rail 5, which roller 6 performs a reciprocating movement by means of linkage 7 operated by a roller 9 engaging the peripheral surface of a cam 8. Each holder 10 comprises a bottom plate and two oppositely disposed side walls. The chain gears 12 are mounted on the support 13, which also carries the drive (not shown) for one of the two chain gears 12.

The knife 15, as well as the inserting device 16, of the sticks are guided in a common carrying frame 14 perpendicularly to the direction of movement of the chain 11, the distance between the knife 15 and the insertion device 16 being at least equal to the distance between each pair of adjacent holders 10 or a multiple of said last mentioned distance. In the embodiment demonstrated in Fig. 1 of the drawings, the knife 15 is spaced apart from the insertion device 16 a distance equal to double the distance between each pair of adjacent holders 10. The knife 15, which stands in operative position with its front point close to the end face of the ice cream body 3, is mounted in the carrying frame 14 for reciprocating movement by means of a haft 17. The end portion of the haft 17, which projects from the carrying frame 14, is equipped with two oppositely disposed external parallel guide faces 18. A rod 20, disposed perpendicularly to the haft 17 and having a recess complementary to the cross-section of the rod 20, is slidable along the guide faces, thereby preventing any rotation of the haft 17 and of the knife 15. The rod 20 is secured to and operated by a control axle 19. An abutment member 21 is secured to the extreme rear end of the haft 17. The abutment member 21 has a downwardly projecting finger 22 to which one end of a draw spring 23 (shown in broken lines) is secured. The other end of the spring 23 is secured to a driver 24 mounted on the control axle 19. Upon operation of a control lever 25, which is loosely disposed on the driver 24, from its original position (Fig. 2), not only the control axle 19 and the rod 20, but also the haft 17 of the knife 15 is advanced by means of the draw spring 23 in a direction toward the ice cream body 3 which is disposed in the holder 10. By proper positioning of the rod 20 on the control axle 19, a forwardmost position for the pointed front end of the knife 15 may be set in its operative position in order to pierce merely the wrapper, but to stop at the opposite end face of the ice cream body. The knife 15 pierces during this movement the wrapper of the ice cream body 3 and, thereby, prepares in this manner for insertion of the stick in a manner that the wrapper is not damaged by such insertion.

The maintenance of the shape of the soft ice cream body 3 is favored on the end face thereof opposite the piercing point by provision of a guide sheet 26, which covers the rear open end faces of the filled holders 10 at least within the range of the knife 15 and the inserting device 16 for the sticks. Furthermore, the still accessible top face and the other end face of the ice cream body 3 are covered by plates 28 within the range of the knife 15 and the inserting device 16, which plates 28 move up and down and are carried by a common rod 27, the angularly bent end face of each of the plates 28 being equipped with a recess in order to permit the insertion of the knife 15 and of the stick through the wrapper.

In order to render inoperative the knife 15, temporarily, particularly in case of any disturbance in the feeding of the ice cream bodies, independently from the continued reciprocating movement of the control lever 25, a manually operable arresting device is provided on the carrying frame 14 above the haft 17 of the knife 15. The arresting device comprises a housing 29 and a head 30 screwed to the top of the housing 29 and having two slots 31 and 32 which are crosswise disposed relative to each other and arranged in different planes, said slots 31 and 32 being adapted to receive selectively a pin 35 secured crosswise to a locking bolt 33 and retained in the slot engaging position by means of a helical spring 34 which is disposed in the housing 29. If the haft 17 of the knife 15 is to be locked in the position shown in Fig. 2 of the drawings, the pin 35 is lifted from the upper slot 31 by pulling the knob 36, then turned into a position 90° away and now released into the lower slot 32. The stud 37 projecting downwardly from the locking bolt 33 is then forced into a recess 38 provided in the haft 17 and, thereby, locks the knife 15 in its withdrawn position.

The inserting device 16 for the sticks which is likewise supported by the carrying frame 14 comprises substantially the hopper 40 receiving the sticks 39 and a rail 41 for the slide 42.

The slide 42 is equipped at its rear free end with a bolt 43 to which one end of a draw spring 44 (shown in broken lines) is secured. The latter extends into the support 13 and the other end of the draw spring 44 is secured to the inner face of the support 13. A control axle 47 is mounted on the support 13 for reciprocating movement below the draw spring 44 and the control axle 47 carries a driver 46. A rod 48 engaging the bolt 43 is secured to the end of the control axle 47 extending from the support 13. Upon operation of the control lever 45, the control axle 47 performs an axial movement and, thereby, the slide 42, due to the force of the draw spring 44, moves in the same direction and ejects the lowermost of the sticks 39, stacked and retained in the hopper 40 by means of a weight 49 (Fig. 4) resting on the uppermost of the sticks 39. The ejection of the lowermost of the sticks 39 is brought about by the head 42a of the slide 42 and the ejected stick 39 is moved through a guide groove 41a (Fig. 3) and then inserted through the previously formed slot of the wrapper into the ice cream body 3 for a predetermined length.

There is here also provided the possibility to stop the operation of the insertion device 16, if an ice cream body 3 does not appear at the insertion station, without, however, interrupting the drive for the inserting device. This is achieved in such manner, that an abutment member 50 of the slide 42 abuts a manually operated locking finger 51, prior to the ejection of the lowermost of the sticks 39, so that the axial movement of the slide 42 is prevented. The finger 51 has a depression which is retained in normal lifted position by means of a spring blade 52. Upon lowering the depression of the finger, by gripping a knob 53 projecting upwardly from the finger 51, the depression engages the abutment member 50 of the slide 42. The draw spring 44 retains the locking finger 51, in the lowered position in engagement with the abutment member 50, thereby locking the slide 42 against forward movement. Upon turning the knob 53 with the locking finger 51 in upward direction, the abutment member 60 is released again.

In order to permit adjustment of the knife 15 as well as of the insertion device 16 to the changed cross point of the two diagonal lines of the end face of the ice cream body 3, in case of a change of the shape of the latter, the carrying frame 14 is secured to the rear face of the support 13 by means of easily removable screws 54 which project through longitudinal slots 55 of the carrying frame 14. Furthermore, guide ledges 56 are provided on both sides of the carrying frame 14. A bolt 57 rotatably mounted in the support 13 has a cam disk 59 which is disposed in a recess 58 of the carrying frame 14. Upon lifting of the screws 54, a hand lever 60, which is, preferably, integrally formed with the bolt 57, may be turned and the cam disk 59 brings about a vertical adjustment of the carrying frame 14.

An exact positioning of the carrying frame 14 may be achieved, for instance, by providing a graduation scale adjacent one of the longitudinal slots 55, whereby the distance from the head of the screw 54 indicates the desired height of the carrying frame 14.

Some sticks, particularly those of wood, are much more difficult to eject from the hopper 40 than others, for instance, paper and cardboard sticks. Disturbances caused by the sticks 39, which may be retained and get out of their proper position in the hopper 40 are speedily remedied by freeing the lowermost of the sticks 39 stacked in the hopper 40 upon swinging over the entire hopper 40 which is carried by an arm 61 which in turn is turnable upon a pivot pin 62. The latter is, preferably, mounted in bearings 63 which are secured to the carrying frame 14. The hopper 40 is retained in operative position by means of a simple pivotally mounted safety lever 64.

During the transfer of the ice cream bodies 3, carrying the sticks 39, from the endless chain 11 to a conveyor band 65, a metal guide sheet 66, surrounding one of the chain gears 12, guides each of the ice cream bodies 3 onto the conveyor band 65. When a holder 10 filled with an ice cream body 3 reaches, in passing the chain gear 12, its lowermost position, a slide (not shown) pushes the packed ice cream body 3 onto the conveyor band 65 and then to a storing table and the freezing chamber. While the folded over ends of the wrapper sheet are on top of the ice cream body 3 during the travel of the latter on the chain 11, said folded over ends being indicated by the diagonal lines on top of each ice cream body 3, upon transfer from the chain 11 to the conveyor band 65, the folded over ends of the wrapper are at the bottom, which not only improves the outer appearance of the wrapper, but also increases appreciably the sealing effect of the wrapper.

While I have disclosed one embodiment of the present invention, it is to be understood that this embodiment is given by example only and not in a limiting sense, the scope of the present invention being determined by the objects and the claims.

I claim:

1. An apparatus for the automatic insertion of sticks into semi-frozen ice cream bodies enclosed by a wrapper, comprising an endless chain having a plurality of holders secured thereto, means for intermittently moving said endless chain, means for feeding wrapped ice cream bodies to said holders, a support carrying said endless chain, a knife mounted on said support at a first station of said chain for axial reciprocating movement in a direction perpendicularly to the direction of movement of said chain, means for advancing said knife from a withdrawn inoperative position towards said ice cream bodies into a forward operative wrapper piercing position close to the opposite end face of said ice cream bodies, said knife forming at said first station a slot-like opening of a predetermined length in one end face of each wrapper without penetrating the ice cream body, and a stick inserting device comprising a hopper carried by said support at a second station of said chain and adapted to receive a stack of said sticks of a width complementary to the length of said slot-like opening, a slide mounted for reciprocating movement below said hopper in order to eject the lowermost of said sticks from said hopper and to insert said stick into said opening of a wrapper and simultaneously into the ice cream body completely sealing up said opening.

2. The apparatus, as set forth in claim 1, which includes means for simultaneous operation of said opening forming knife piercing one of said wrappers surrounding said ice cream bodies and of said stick inserting slide in another of said ice cream bodies through said previously formed opening for insertion of a stick in said wrapper.

3. The apparatus, as set forth in claim 1, which includes means for successive operation of said opening forming knife and of said stick inserting slide on one of said ice cream bodies.

4. The apparatus, as set forth in claim 1, which includes a pair of spaced, angularly bent cover plates mounted at each of said stations for vertical reciprocating movement, each of said plates being adapted to cover one of the end faces of an ice cream body and having a recess opposite the covered end face of said ice cream body, in order to permit penetration of said knife and of said slide, respectively, through the recess of said plates.

5. The apparatus, as set forth in claim 1, in which said knife and said slide are disposed in the same plane and at a distance from each other at least equal to twice the distance between a pair of adjacent ice cream bodies on said endless chain.

6. An apparatus for the automatic insertion of sticks into ice cream bodies enclosed in a wrapper, comprising an endless chain having a plurality of holders secured thereto, means for intermittently moving said endless chain, means for feeding said wrapped ice cream bodies to said holders, a support carrying said endless chain, a knife mounted on said support for axial reciprocating movement in a direction perpendicularly to the direction of the movement of said chain, said knife forming at a first station a slot-like opening in one end face of the wrapper enclosing the ice cream body in the holder at said station, and a stick inserting device disposed spaced apart from said knife in the direction of the movement of said chain and comprising a hopper carried by said support at a second station of said chain and adapted to receive a stack of said sticks, a slide mounted for reciprocating movement below said hopper in order to eject the lowermost of said sticks from said hopper and to insert said stick through said opening in said wrapper into said ice cream body completely sealing up said opening, and a vertically adjustable carrying frame secured to said support, and said knife and said stick inserting device being mounted on said carrying frame.

7. An apparatus for the automatic insertion of sticks into ice cream bodies enclosed in a wrapper, comprising an endless chain having a plurality of holders secured thereto, means for intermittently moving said endless chain, means for feeding said wrapped ice cream bodies to said holders, a support carrying said endless chain, a knife mounted on said support for axial reciprocating movement in a direction perpendicularly to the direction of the movement of said chain, said knife forming at a first station a slot-like opening in one end face of the wrapper enclosing the ice cream body in the holder at said station, and a stick inserting device disposed spaced apart from said knife in the direction of the movement of said chain and comprising a hopper carried by said support at a second station of said chain and adapted to receive a stack of said sticks, a slide mounted for reciprocating movement below said hopper in order to eject the lowermost of said sticks from said hopper and to insert said stick through said opening of said wrapper into said ice cream body completely sealing up said opening, and manually operable means for retaining said knife in withdrawn inoperative position.

8. An apparatus for the automatic insertion of sticks into ice cream bodies enclosed in a wrapper, comprising an endless chain having a plurality of holders secured thereto, means for intermittently moving said endless chain, means for feeding said wrapped ice cream bodies to said holders, a support for carrying said endless chain, a knife mounted on said support for axial reciprocating movement in a direction perpendicularly to the direction of the movement of said chain, said knife forming at a first station a slot-like opening in one end face of the wrapper enclosing the ice cream body in the holder at said station, and a stick inserting device disposed spaced apart from said knife in the direction of the movement of said chain and comprising a hopper carried by said support at a second station of said chain and adapted to receive a stack of said sticks, a slide mounted for reciprocating movement below said hopper in order to eject the lowermost of said sticks from said hopper and to insert said stick through said opening of said wrapper into said ice cream body completely sealing up said opening, and manually operable means for retaining said slide in withdrawn inoperative position.

9. An apparatus for the automatic insertion of sticks into ice cream bodies enclosed in a wrapper, comprising an endless chain having a plurality of holders secured thereto, means for intermittently moving said endless chain, means for feeding said wrapped ice cream bodies to said holders, a support carrying said endless chain, a knife mounted on said support for axial reciprocating movement in a direction perpendicularly to the direction of the movement of said chain, said knife forming at a first station a slot-like opening in one end face of the wrapper enclosing the ice cream body in the holder at said station, and a stick inserting device disposed spaced apart from said knife in the direction of the movement of said chain and comprising a hopper carried by said support at a second station of said chain and adapted to receive a stack of said sticks, a slide mounted for reciprocating movement below said hopper in order to eject the lowermost of said sticks from said hopper and to insert said stick through said opening of said wrapper into said ice cream body completely sealing up said opening, and said hopper being pivotally mounted on said support to swing upon a horizontally disposed axis, in order to provide access to the lower part of said hopper upon swinging said hopper into a turned down inoperative position.

References Cited in the file of this patent

UNITED STATES PATENTS

| | | |
|---|---|---|
| 1,520,302 | Morgan | Dec. 23, 1924 |
| 1,544,120 | Zickos et al. | June 30, 1925 |
| 1,888,178 | MacElhone | Nov. 15, 1932 |
| 1,922,563 | West | Aug. 15, 1933 |
| 1,963,768 | West | June 19, 1934 |
| 2,310,256 | Overland | Feb. 9, 1943 |
| 2,320,985 | Overland | June 1, 1943 |
| 2,559,463 | Rasmusson | July 3, 1951 |
| 2,681,624 | Sergent | June 22, 1954 |